United States Patent Office.

CHARLES TENNANT LEE, OF BOSTON, MASSACHUSETTS.

COMPOSITION FOR MAKING NON-CONDUCTING HANDLES FOR SAD-IRONS, &c.

SPECIFICATION forming part of Letters Patent No. 308,778, dated December 2, 1884.

Application filed February 9, 1884. (No specimens.)

*To all whom it may concern:*

Be it known that I, CHARLES TENNANT LEE, of Boston, in the county of Suffolk and State of Massachusetts, have invented a new and useful Composition of Matter for Making Non-Conducting Handles for Sad-Irons, &c., of which the following is a specification.

The object of my invention is to produce a tough solid material which is adapted for use in making handles for stoves, flat-irons, soldering-irons, pots, kettles, and the like, and for other similar uses where a bad conductor of heat not easily injured by exposure to heat is required.

My new compound consists of three ingredients—first, mica powdered or broken into small pieces, or other bodies which, like mica, are refractory to and poor conductors of heat; secondly, gelatine or glue; and, thirdly, salts by which the glue is so altered that it does not become tacky or soft when exposed to moisture.

In preparing my compound I produce the best results as follows: I liquefy the glue by heat and water, using about one part, by weight, of glue to three parts, by weight, of water, and heating the liquid mass to about the boiling-point of water, then mix well into this liquid a solution of the acetate of iron at about thirty-six degrees (36°) Twaddle's hydrometer, (22° Baumé,) using about fifteen parts, by weight, of the solution of acetate of iron for every hundred parts, by weight, of the glue used. The liquid so compounded is then stirred well into a quantity of the mica, which is heated to about 120° Fahrenheit before the liquid is added, and which is kept warm until molded into the shape desired. This compound, when cooled, will become hard and tough, is not affected by moisture, and is admirably adapted for the purposes above referred to. The best proportions, by weight, of the binding solution and the powdered or subdivided refractory matter are about one pound of the former to one pound of the latter when mica is used; but as this is a question largely of the bulk of the refractory matter and its state of subdivision, it is obvious that the best proportions, by weight, will depend somewhat upon the weight of a given bulk of the refractory matter, and also upon its capacity for absorbing the binding solution. Practically the proper quantity of the solution is easily ascertained, it having that quantity which, when thoroughly intermixed with the refractory matter, will make a somewhat plastic mass substantially free from dry powder.

What I claim as my invention is—

The composition of matter above described, consisting of particles of refractory matter— such as mica—bound together by glue treated as described.

CHAS. TENNANT LEE.

Witnesses:
J. E. MAYNADIER,
J. R. SNOW.